(12) United States Patent
Konda et al.

(10) Patent No.: US 9,109,130 B2
(45) Date of Patent: Aug. 18, 2015

(54) ACTIVE ENERGY RAY-CURABLE INKJET MAGENTA INK COMPOSITION

(75) Inventors: Yohei Konda, Tokyo (JP); Mayuko Okamoto, Tokyo (JP); Yuji Kameyama, Tokyo (JP); Kazuhiro Jonai, Tokyo (JP); Norio Suzuki, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 14/241,743

(22) PCT Filed: Aug. 29, 2012

(86) PCT No.: PCT/JP2012/071920
§ 371 (c)(1),
(2), (4) Date: Feb. 27, 2014

(87) PCT Pub. No.: WO2013/031870
PCT Pub. Date: Mar. 7, 2013

(65) Prior Publication Data
US 2014/0224150 A1   Aug. 14, 2014

(30) Foreign Application Priority Data
Aug. 29, 2011   (JP) ................................. 2011-186473

(51) Int. Cl.
| C08F 2/46 | (2006.01) |
| C08G 61/04 | (2006.01) |
| C09D 11/322 | (2014.01) |
| C09D 11/00 | (2014.01) |
| C09B 67/22 | (2006.01) |
| C09D 11/101 | (2014.01) |
| C09D 11/40 | (2014.01) |

(52) U.S. Cl.
CPC .......... *C09D 11/322* (2013.01); *C09B 67/0036* (2013.01); *C09D 11/00* (2013.01); *C09D 11/101* (2013.01); *C09D 11/40* (2013.01)

(58) Field of Classification Search
CPC ...... C09D 11/322; C09D 11/40; C09D 11/00; C09D 11/101; C09B 67/0036; C09B 29/33; C09B 57/04; C09B 48/00
USPC .................................................. 522/1; 520/1
See application file for complete search history.

(56) References Cited

U.S. PATENT DOCUMENTS

| 6,251,553 B1 * | 6/2001 | Baur et al. ............... 430/108.21 |
| 6,312,512 B1 * | 11/2001 | Urban et al. .................. 106/495 |
| 2005/0039632 A1 | 2/2005 | Yamamoto et al. |
| 2009/0030144 A1 | 1/2009 | Mizutani et al. |
| 2009/0246480 A1 | 10/2009 | Saito |
| 2010/0018438 A1 * | 1/2010 | Claes et al. ................ 106/31.77 |
| 2010/0247772 A1 | 9/2010 | Saito |
| 2011/0083581 A1 | 4/2011 | Kataoka |
| 2013/0029265 A1 * | 1/2013 | Solduga Ramirez et al. . 430/115 |
| 2013/0288023 A1 | 10/2013 | Koganehira et al. |

FOREIGN PATENT DOCUMENTS

| EP | 2 105 479 | | 9/2009 |
| EP | 2 236 569 | | 10/2010 |
| EP | 2 412 764 A1 | | 2/2012 |
| JP | 2006-096927 | * | 4/2006 |
| JP | 2006-282810 | * | 10/2006 |
| JP | 2009-24072 | | 2/2009 |
| JP | 2009-102661 | | 5/2009 |
| JP | 2009-256611 | * | 11/2009 |
| JP | 2010-235897 | | 10/2010 |
| JP | 2011-105826 | | 6/2011 |
| JP | 2011-122107 | | 6/2011 |
| JP | 2012-25913 | | 2/2012 |
| JP | 2012-67179 | | 4/2012 |
| WO | WO 2008/043692 A1 | | 4/2008 |
| WO | 2011-124327 | * | 10/2011 |

OTHER PUBLICATIONS

Saito, 2009-256611 Machine Translation, Nov. 5, 2009.*
Nemoto et al, JP 2006-096927 Machine Translation, Apr. 13, 2006.*
Kasahara et al, JP 2006-282810 Machine Translation, Oct. 19, 2006.*
Saito, JP 2009-256611 Machine Translation, Nov. 5, 2009.*
International Preliminary Report on Patentability and Written Opinion issued Mar. 4, 2014 in PCT/JP2012/071920 (submitting English translation only).
International Search Report issued Nov. 13, 2012, in PCT/JP12/071920 filed Aug. 29, 2012.
Japanese Office Action issued Nov. 29, 2013 and Jan. 31, 2013 in Japanese Patent Application No. 2011-186473 filed Aug. 29, 2011 (with partial English Translation).
European Search Report issued Mar. 20, 2015, in European Application No. EP 12 82 7858.

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

The present invention provides an active energy ray-curable inkjet magenta ink composition that achieves excellent color reproducibility and is also excellent in storage stability, and an ink set using the composition. The magenta ink composition according to the present invention contains, as two kinds of quinacridone pigments, (A) unsubstituted quinacridone and (B) 2,9-dimethylquinacridone.

14 Claims, No Drawings

ACTIVE ENERGY RAY-CURABLE INKJET MAGENTA INK COMPOSITION

This application is a 371 of PCT/JP12/71920 filed Aug. 29, 2012. Priority to Japanese patent application 2011-186473 filed Aug. 29, 2011, is claimed.

TECHNICAL FIELD

The present invention relates to an active energy ray-curable inkjet magenta ink composition comprising two kinds of quinacridone pigments, that is (A) unsubstituted quinacridone and (B) 2,9-dimethylquinacridone. The above-mentioned magenta ink according to the present invention offers a broad color reproduction region and has fine storage stability.

BACKGROUND ART

Various ink compositions such as solvent types, aqueous types and oil-based types have been conventionally known as inks used in inkjet printing. Among these, the demand for active energy ray-curable inkjet inks has increased in recent years due to their advantages that they can also be applied to no-absorbable substrates such as plastics and glasses, and that they decrease the volatilization volumes of solvents and thus are environment-friendly. Specifically, in the field of industrial inkjet printing, substitution of solvent type and aqueous type inkjet inks with active energy ray-curable inkjet inks is expected from the viewpoints of water resistance, dry energy of inks, adhesion of ink components to heads due to drying, and the like, besides the above-mentioned advantages.

On the other hand, in inkjet inks, the color reproducibility of an image quality formed significantly varies depending on the degrees of the color reproduction potentials that can be possessed by three colors: yellow, magenta and cyan. Therefore, selection of pigments is a very important factor.

For example, Patent Documents 1 and 2 ensure desired color regions by selecting suitable pigments, but these relate to aqueous type inkjet inks. In active energy ray-curable inkjet inks, polymerizable monomers are used as dispersion solvents. Therefore, the dispersibilities of pigments decrease, and thus it is difficult to obtain desired color regions even if similar pigments to those of Patent Documents 1 and 2 are selected.

Patent Document 3 selects a so-called solid solution in which unsubstituted quinacridone and 2,9-dichloroquinacridone are dissolved in one another in the same crystal as magenta pigment to thereby achieve a broad range of color reproduction property in an active energy ray-curable inkjet ink. However, a pigment dispersion using a solid solution is poor in storage stability. In addition, an active energy ray-curable inkjet ink using a solid solution tends to offer a slow curing velocity during printing. Therefore, use of a solid solution is considered to be not preferable in view of increasing in printing speed.

Furthermore, Patent Document 3 defines the used pigments based on transmission absorption spectra. However, the color shade and texture of a printed matter by an inkjet ink significantly depend on print media, the primary particle diameters of pigment dispersions, and the like, and thus it is considered to be preferable to evaluate a hue with consideration for a final printed matter with reflection spectra.

PRIOR ART DOCUMENT

Patent Documents

Patent Document 1: JP 2009-024072 A
Patent Document 2: JP 2009-102661 A
Patent Document 3: WO 2008/043692 A

SUMMARY OF INVENTION

The present invention aims at providing an active energy ray-curable inkjet ink composition that achieves excellent color reproducibility and is excellent in storage stability. The present inventors did intensive studies about pigments for an active energy ray-curable inkjet ink, and consequently found that excellent color reproducibility and storage stability can be achieved by a combination of specific quinacridone pigments, and completed the present invention.

Specifically, the present invention relates to the embodiments described below.

(1) An active energy ray-curable inkjet magenta ink composition comprising two kinds of quinacridone pigments, wherein the two kinds of quinacridone pigments are (A) unsubstituted quinacridone and (B) 2,9-dimethylquinacridone.

(2) The magenta ink composition according to (1), wherein the weight ratio of the unsubstituted quinacridone (A) and the 2,9-dimethylquinacridone (B) is (A):(B)=from 75:25 to 40:60.

(3) An active energy ray-curable inkjet ink set, comprising: the magenta ink composition according to (1) or (2); and at least, an active energy ray-curable inkjet yellow ink composition and an active energy ray-curable inkjet cyan ink composition.

(4) The ink set according to (3), wherein the active energy ray-curable inkjet yellow ink composition contains a yellow pigment having a benzimidazolone backbone or an isoindoline backbone.

The disclosure of the present invention relates to the subject of Japanese Patent Application No. 2011-186473 filed on Aug. 29, 2011, and the disclosures of this description is entirely incorporated herein by reference.

DESCRIPTION OF EMBODIMENTS

An embodiment of the present invention is an active energy ray-curable inkjet magenta ink composition comprising two kinds of quinacridone pigments, wherein the two kinds of quinacridone pigments are (A) unsubstituted quinacridone and (B) 2,9-dimethylquinacridone.

In the present description, the "active energy ray" means an energy ray that can affect the electron orbitals of a polymerizable component in an ink composition to be irradiated and induce a polymerization reaction such as radical, cationic and anionic. In the magenta ink composition according to the present invention, a polymerization reaction of the polymerizable component in the composition progresses by the irradiation of the above-mentioned active energy ray to form a cured product.

The above-mentioned active energy ray may be, but is not limited to, for example, electron beam, ultraviolet ray or infrared ray. In the case when ultraviolet ray is irradiated as the above-mentioned active energy ray, for example, a high pressure mercury lamp, a metal halide lamp, a low pressure mercury lamp, an ultrahigh pressure mercury lamp, an ultraviolet laser, an LED and solar light can be used as a light source.

In the above-mentioned embodiment, the term "comprising two kinds of magenta pigments" means that two kinds of pigments having different crystal structures from each other are contained as independent components. Therefore, the two kinds of pigment may be firstly mixed and dispersed, or the two kinds of pigment dispersions may be separately dispersed and then mixed later. However, the above-mentioned term intends that the dispersion of a solid solution of the two kinds of pigments is not included in the embodiments of the present invention.

The embodiment of the magenta ink composition according to the present invention will be explained in more detail. One of the two kinds of magenta pigments used in the present invention is (A) unsubstituted quinacridone. The unsubstituted quinacridone is a pigment known as C. I. Pigment Violet 19. For example, it is commercially available as "Inkjet Magenta E5B02" by Clariant, "CROMOPHTAL RED 2020" by BASF, and the like.

The other of the two kinds of magenta pigments used in the present invention is (B) 2,9-dimethylquinacridone. 2,9-dimethylquinacridone is a pigment known as C. I. Pigment Red 122. For example, it is commercially available as "CROMOPHTAL JET Magenta DMQ" and "CROMOPHTAL Pink PT SA" by BASF, "Toner Magenta E" and "Inkjet Magenta E02" by Clariant, and the like.

In the magenta ink composition according to the present invention, a combination of the specific two kinds of magenta pigments, specifically, a combination of (A) unsubstituted quinacridone and (B) 2,9-dimethylquinacridone, is essential. In an embodiment of the present invention, it is preferable that the weight ratio of (A) and (B) is (A):(B)=from 75:25 to 40:60 in view of the hue in RED region. More preferably, (A):(B)= from 75:25 to 50:50. By adjusting the above-mentioned weight ratio to the above-mentioned range, a broad hue is easily achieved.

In an embodiment of the present invention, it is preferable to respectively miniaturize the above-mentioned two kinds of magenta pigments in the ink composition. An organic pigment can be miniaturized by the following method. Specifically, a mixture composed of at least three components: an organic pigment, a water-soluble inorganic salt in a three-fold weight or more of the organic pigment and a water-soluble solvent is formed into a clay-like mixture, the mixture is miniaturized by strongly kneading with a kneader or the like and then put into water, and the mixture is stirred by a high-speed mixer or the like to give a slurry form. Subsequently, the slurry is repeatedly filtered and washed with water to remove the water-soluble inorganic salt and water-soluble solvent. In the miniaturization step, a resin, a pigment dispersing agent and the like can be added.

The water-soluble inorganic salt may include sodium chloride, potassium chloride and the like. These inorganic salts are used in the range of three-fold by weight or more, preferably 20-fold by weight or less of the organic pigment. By setting the amount of the inorganic salt to three-fold by weight or more, a pigment processed into a desired size can be easily obtained. On the other hand, by setting the amount of the inorganic salt to 20-fold by weight or less, the washing treatment in the subsequent step is easy, and thus an organic pigment processed into a desired size is obtained easily and efficiently.

Although the water-soluble solvent is not specifically limited as long as it is a solvent that is used to efficiently conduct sufficient pulverization by making a suitable clay state of the organic pigment and the water-soluble inorganic salt used as a pulverization aid, and is soluble in water, a solvent having a high boiling point of a boiling point of 120 to 250° C. is preferable in view of safeness, since the temperature rises during kneading to put the solvent into a state in which the solvent easily vaporizes. Examples of the water-soluble solvent may include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low molecular weight polypropylene glycol and the like.

In an embodiment of the present invention, it is preferable to respectively form the above-mentioned two kinds of magenta pigments into pigment dispersions. A pigment dispersion can be obtained by, for example, a method in which a pigment, a pigment dispersing agent, a polymerizable monomer, and various additives such as a dispersion aid as necessary are thoroughly dispersed in advance by using a general dispersing apparatus such as a sand mill, and can be obtained as a concentrated liquid comprising the pigment at a high concentration.

In the above-mentioned embodiment, it is preferable to use a basic pigment dispersing agent as the pigment dispersing agent for either of the pigments. Furthermore, in an embodiment of the present invention, it is preferable to incorporate acidic derivatives of the above-mentioned pigments during the preparation of the pigment dispersions so as to further improve the dispersibility of the pigments and the storage stability of the ink composition. In such embodiment, in the case when a basic pigment dispersing agent such as an aliphatic amine-based compound comprising an aliphatic acid amine is used as the pigment dispersing agent, it is preferable since the compound becomes a counter of the above-mentioned pigment.

It is also possible to obtain the above-mentioned basic pigment dispersing agent as a commercially available product. For example, it is commercially available under the trade names of SOLSPERSE 13000 series, 24000SC, 24000GR, 28000, 32000 series, 33000, 35000 series, 36000 series, 39000, 56000 and J100 manufactured by Lubrizol Japan Ltd. Among these, it is preferable to use SOLSPERSE 32000, 35000, 39000, 56000 and J100, and it is more preferable to use SOLSPERSE 32000 and J100.

SOLSPERSE 32000 is a comb-shaped resin dispersing agent of an aliphatic acid amine having a polyethyleneimine as a main backbone. On the other hand, SOLSPERSE J100 is a comb-shaped resin dispersing agent of an aliphatic acid amine having a polyethyleneimine as a main backbone, and more specifically, it contains a polyethyleneimine as a main backbone and urethane backbones as side chains, and the urethane backbones are formed by using trylene diisocyanate (TDI) as an isocyanate and propylene glycols (PPGs) and ethylene glycols (PEGs) as an alcohol.

Furthermore, in the above-mentioned embodiment, the polymerizable monomer used in the preparation of the pigment dispersion is not specifically limited as long as it has an ethylenic double bond, and examples may include acrylic monomers such as monofunctional acrylic monomers, bifunctional acrylic monomers and tri- or more functional acrylic monomers, or heteromonomers each containing a vinyl monomer, a vinyl ether monomer or an acrylic group and a vinyl group in the molecule, and the like. Although specific limitation is not intended, in an embodiment of the present invention, it is preferable to use at least dipropylene glycol diacrylate as the polymerizable monomer.

In the active energy ray-curable inkjet magenta ink composition according to the present invention, besides the above-mentioned pigments or pigment dispersions, polymerizable compounds that are well-known as components for active energy ray-curable inks, and polymer components such as oligomers and prepolymers can be used if necessary.

In addition, the above-mentioned polymerizable compounds may be monofunctional monomers and multifunctional monomers, and may be the same as or different from the polymerizable monomers used in the preparation of the pigment dispersions. Specific examples of the polymerizable compound, including exemplification of the polymerizable monomers, will be shown below.

Examples of the monofunctional monomers may include benzyl (meth)acrylate, (ethoxylated (or propoxylated) 2-phenoxyethyl (meth)acrylate, dicyclopentenyl (oxyethyl) (meth)acrylate, phenoxydiethylene glycol (meth)acrylate, 2-methoxyethyl (meth)acrylate, methoxytriethylene glycol (meth)acrylate, 2-ethoxyethyl (meth)acrylate, ethoxyethoxyethyl (meth)acrylate, methoxydipropylene glycol (meth)acrylate, dipropylene glycol (meth)acrylate, β-carboxylethyl (meth)acrylate, trimethylolpropaneformal (meth)acrylate, isoamyl (meth)acrylate, cyclohexyl (meth)acrylate, tetrahydrofurfuryl (meth)acrylate, isoboronyl (meth)acrylate, dicyclopentanyl (meth)acrylate, isooctyl (meth)acrylate, lauryl (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine, N-vinylcaprolactam, N-vinylpyrrolidone, N-vinylformamide and N-acryloyloxyethylhexahydrophthalimide.

Furthermore, examples of the multifunctional monomers may include dimethylol-tricyclodecane di(meth)acrylate, (ethoxylated (or propoxylated)) bisphenol A di(meth)acrylate, cyclohexanedimethanol di(meth)acrylate, (poly)ethylene glycol di(meth)acrylate, (ethoxylated (or propoxylated)) 1,6-hexanediol di(meth)acrylate, (ethoxylated (or propoxylated))neopentyl glycol di(meth)acrylate, hydroxypivalic acid neopentyl glycol di(meth)acrylate, dipropylene glycol di(meth)acrylate, (neopentyl glycol-modified) trimethylolpropane di(meth)acrylate, tripropylene glycol di(meth)acrylate, dicyclopentanyl di(meth)acrylate, pentaerythritol tri (or tetra) (meth)acrylate, trimethylolpropane tri (or tetra) (meth)acrylate, tetramethylolmethane tri (or tetra) (meth)acrylate and dipentaerythritol hexa(meth)acrylate. The above-mentioned active energy ray-curable polymerizable monomers may be used alone or in combination of two or more.

Among these, in the inkjet magenta ink composition of the present invention, it is preferable to use, as the monofunctional monomer(s), at least one kind selected from the group consisting of phenoxyethyl acrylate, ethoxyethoxyethyl acrylate, isoboronyl acrylate, isooctyl acrylate, lauryl acrylate, N-vinylcaprolactam and N-acryloyloxyethyl hexahydrophthalimide. Furthermore, it is preferable to use, as the multifunctional monomer(s), at least one kind selected from the group consisting of dimethylol-tricyclodecane diacrylate, (ethoxylated (or propoxylated)) bisphenol A diacrylate, (ethoxylated (or propoxylated)) neopentyl glycol diacrylate, hydroxypivalic acid neopentyl glycol diacrylate, 1,6-hexanediol diacrylate, dipropylene glycol diacrylate, tripropylene glycol diacrylate and 2-(2-vinyloxyethoxy) ethyl acrylate.

In an embodiment of the present invention, a polymer component called as an oligomer or prepolymer may be used besides the polymerizable compounds exemplified above. Specific examples may include, but are not specifically limited to, the followings:

"EBECRYL 230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25T0, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040 and IRR419", which are manufactured by Daicel UCB Co., Ltd.;

"CN104, CN120, CN124, CN136, CN151, CN2270, CN2271E, CN435, CN454, CN970, CN971, CN972, CN9782, CN981, CN9893 and CN991", which are manufactured by Sartomer;

"LAROMER EA81, LR8713, LR8765, LR8986, PE56F, PE44F, LR8800, PE46T, LR8907, P043F, P077F, PE55F, LR8967, LR8981, LR8982, LR8992, LR9004, LR8956, LR8985, LR8987, UP35D, UA19T, LR9005, P083F, P033F, P084F, P094F, LR8863, LR8869, LR8889, LR8997, LR8996, LR9013, LR9019, P09026V, PE9027V", which are manufactured by BASF;

"PHOTOMER 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572 and 3660", which are manufactured by Cognis;

"ART-RESIN UN-9000HP, 9000PEP, 9200A, 7600, 5200, 1003, 1255, 3320HA, 3320HB, 3320HC, 3320HS, 901T, 1200TPK, 6060PTM and 6060P", which are manufactured by Negami Chemical Industrial Co., Ltd;

"SHIKOH UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA and 2750B", which are manufactured by Nippon Synthetic Chemical Industry Co., Ltd.; and "KAYARAD R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510 and UX-4101", which are manufactured by Nippon Kayaku Co., Ltd.

In an embodiment of the present invention, the content of the polymerizable compound in the ink composition is in the range of preferably 60 to 95% by weight based on the total weight of the ink composition.

In the case when an ink is cured by using active energy ray such as ultraviolet ray in the present invention, a photopolymerization initiator is incorporated in the ink composition. The photopolymerization initiator used in the present invention may be a known photopolymerization initiator, and it is preferable to suitably select with consideration for the curing velocity, the physical properties of the cured coating, the properties of the pigments, and the like. In an embodiment of the present invention, it is preferable to use a molecule-cleavage type or hydrogen-drawing type photopolymerization initiator that causes radicals. In the present invention, the photopolymerization initiators may be used alone or in combination of two or more. Alternatively, a photopolymerization initiator that causes radicals and a photopolymerization initiator that causes cations may be used in combination.

Specific examples of the photopolymerization initiator may include, but are not specifically limited to, 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methyl-propan-1-one, phenylglyoxilic acid methyl ester, 2-methyl-1-[4-

(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butanon-1-one, bis(2,4,6-trimethylbenzoyl)-phenylphosphine oxide, 2,4,6-trimethylbenzoyl-diphenyl-phosphine oxide, 1,2-octanedione, 1-[4-(phenylthio)phenyl]-, 2-(O-benzoyloxime)], ethanone, 1-[9-ethyl-6-(2-methylbenzoyl)-9H-carbazol-3-yl]-, 1-(O-acetyloxime), benzophenone, 4-phenylbenzophenone, isophthalphenone and 4-benzoyl-4'-methyl-diphenylsulfide.

Furthermore, a sensitizer may be used in combination with the above-mentioned photopolymerization initiator. Specific examples of the sensitizer may include trimethylamine, methyldimethanolamine, triethanolamine, p-diethylaminoacetophenone, p-dimethylaminoethyl benzoate, p-dimethylaminoisoamyl benzoate, N,N-dimethylbenzylamine and 4,4'-bis(diethylamino)benzophenone, and the like. In the case when the above-mentioned photopolymerization initiator and sensitizer are used, it is preferable to select those having excellent solubility in the ink composition and do not inhibit ultraviolet permeability.

The content of the above-mentioned photopolymerization initiator is preferably in the range of 2 to 20% by weight with respect to the total weight of the above-mentioned polymerizable compound. By setting the above-mentioned content to 2% by weight or more, excellent curability is easily obtained. On the other hand, by setting the above-mentioned content to 20% by weight or less, the curing velocity is efficiently and easily raised, and the photopolymerization initiator can be easily dissolved. If the above-mentioned content is more than 20% by weight, the curability is not changed, but an unsolved component may be generated. If the unsolved component is present in the ink composition, it is not preferable since problems such as deterioration of the inkjet ejection property and precipitation of the photopolymerization initiator at a low temperature may be caused.

A preferable embodiment of the magenta ink composition according to the present invention contains two kinds of magenta pigments: (A) unsubstituted quinacridone and (B) 2,9-dimethylquinacridone, as pigment dispersions, respectively, and further contains a polymerizable compound and a photopolymerization initiator. Such ink composition can be produced by adding the pigment dispersions that have been prepared in advance, to the polymerizable compound, and mixing the mixture to effect dispersion, and subsequently adding and dissolving the photopolymerization initiator therein. In this case, it is preferable to filtrate the ink composition with a filter having a pore diameter of 3 μm or less, preferably a pore diameter of 1 μm or less, after the dispersion and/or the dissolution of the photoradical polymerization initiator, so as to prevent clogging at a head.

As an embodiment of the present invention, an active energy ray-curable inkjet ink set can be provided by combining: the magenta ink composition according to the present invention as explained above; with at least, yellow ink composition and cyan ink composition, which are respectively used for an active energy ray-curable inkjet printing. The above-mentioned yellow ink composition and cyan ink composition can be constituted in a similar manner except that the magenta pigments in the magenta ink composition according to the present invention are changed to the yellow pigment and cyan pigment, respectively. The yellow pigment and cyan pigment are not specifically limited and can be selected from well-known compounds.

As an embodiment of the yellow ink composition, a yellow pigment having a benzimidazolone backbone can be used. Examples may include C. I. Pigment Yellow 120, 151, 154, 156, 175, 180, 181 and 194, and the like. Among these, it is more preferable to use C. I. Pigment Yellow 180. C. I. Pigment Yellow 180 is commercially available as "PV FAST YELLOW HG" and "Toner Yellow HG" by Clariant, and the like.

Furthermore, as an embodiment of the yellow ink composition, a yellow pigment having an isoindoline backbone can be used. Examples may include C. I. Pigment Yellow 109, 110, 139, 177, 178 and 185, and the like. Among these, it is more preferable to use C. I. Pigment Yellow 185 or C. I. Pigment Yellow 139. C. I. Pigment Yellow 185 is commercially available as "Palitol Yellow D 1155" and "Palitol Yellow L 1155" by BASF, and the like. Furthermore, C. I. Pigment Yellow 139 is commercially available as "Palitol Yellow D 1819" by BASF, "Novoperm Yellow M2R 70" by Clariant, and the like.

Furthermore, as an embodiment of the cyan ink composition, a phthalocyanine pigment can be used. For example, the phthalocyanine pigment is commercially available as "LIONOL BLUE FG-7400G" manufactured by Toyo Ink Co., Ltd.

The embodiments of the present invention have been explained. However, it is needless to say that the described embodiments can be variously modified within the scope that does not deviate from the gist of the present invention. The magenta ink composition according to the present invention and the ink set using the ink composition can be preferably used for use in inkjet printing. Specifically, at first, the ink composition or ink set according to the present invention is fed to a printer head of a printer for an inkjet recording system, then ejected from this printer head onto a substrate, and then irradiated with active energy ray such as ultraviolet ray or electron beam. By this way, the ink composition on the printed substrate is rapidly cured to form a cured coating, thereby a printed surface can be provided. According to the present invention, a printed surface having excellent color reproducibility can be provided.

The ink composition and ink set according to the present invention can be compatible with various printing substrates. Examples of the printing substrates may include, but are not specifically limited to, plastic substrates such as polycarbonate, hard polyvinyl chloride, soft polyvinyl chloride, polystyrene, foamed polystyrene, PMMA, polypropylene, polyethylene and PET, or combined or modified articles thereof; paper substrates such as high-quality paper, art paper, coated paper and cast-coated paper; and glasses, metal substrates such as stainless.

EXAMPLES

Hereinafter the present invention will further be specifically explained by Examples and Comparative Examples, but the embodiments of the present invention are not limited to these examples. Furthermore, the specific conditions of Examples and Comparative Examples are shown in the following Tables 1 to 4, and the various results of the evaluation are shown in Table 5, respectively. In addition, all of the numbers relating to the respective components in the tables are represented by parts by weight.

I. Preparation of Respective Ink Composition

Firstly, the respective ink compositions were prepared as follows.

(Preparation of Magenta Ink Composition)

1. Preparation of Magenta Pigment Dispersion

Prior to the preparation of magenta ink composition, magenta pigment dispersion was prepared in accordance with the following procedure. Firstly, the respective materials described in Table 1 were stirred by a high-speed mixer until the materials became homogeneous to give a mill base. The obtained mill base was then dispersed in a dyno-mill to give a pigment dispersion. The above-mentioned dispersion was conducted by filling zirconia beads each having a diameter of 1 mm. Although the dispersion time is not specifically limited as long as a homogeneous dispersion state can be obtained, 2.5 to 3.5 hours was preferable.

TABLE 1

| Magenta Pigment Dispersion | | | | | | | | | |
|---|---|---|---|---|---|---|---|---|---|
| | Pigment(s) | | | | | Dispersing agent | | | Dispersion |
| Magenta pigment dispersion | PV19 | PR122 | PR202 | PV19/PR122 Solid Solution | PV19/PR202 Solid Solution | SOLSPERSE 32000 | SOLSPERSE J100 | Dispersion aid | medium DPGDA |
| M1 | 11.00% | 4.00% | | | | 5.00% | | 0.50% | 79.50% |
| M2 | | | | | | | 20.00% | | 65.00% |
| M3 | 10.00% | 5.00% | | | | 5.00% | | 0.50% | 79.50% |
| M4 | | | | | | | 20.00% | | 65.00% |
| M5 | 7.00% | 8.00% | | | | 5.00% | | 0.50% | 79.50% |
| M6 | | | | | | | 20.00% | | 65.00% |
| M7 | 12.00% | 3.00% | | | | 5.00% | | 0.50% | 79.50% |
| M8 | | | | | | | 20.00% | | 65.00% |
| M9 | 4.50% | 10.50% | | | | 5.00% | | 0.50% | 79.50% |
| M10 | | | | | | | 20.00% | | 65.00% |
| M11 | 15.00% | | | | | 5.00% | | 0.50% | 79.50% |
| M12 | | | | | | | 20.00% | | 65.00% |
| M13 | | 15.00% | | | | 5.00% | | 0.50% | 79.50% |
| M14 | | | | | | | 20.00% | | 65.00% |
| M15 | 10.00% | | 5.00% | | | 5.00% | | 0.50% | 79.50% |
| M16 | | | | | | | 20.00% | | 65.00% |
| M17 | | | | 15.00% | | 5.00% | | 0.50% | 79.50% |
| M18 | | | | | | | 20.00% | | 65.00% |
| M19 | | | | | 15.00% | 5.00% | | 0.50% | 79.50% |
| M20 | | | | | | | 20.00% | | 65.00% |

The abbreviations in the table are as follows.
*PV19: C.I. Pigment Violet 19
*PR122: C.I. Pigment Red 122
*PR202: C.I. Pigment Red 202 ("CINQUASIA MAGENTA RT-235D" manufactured by BASF)
*DPGDA: dipropylene glycol diacrylate ("PHOTOMER4226" manufactured by Cognis)

2. Preparation of Magenta Ink Composition

The respective materials described in Table 2 were sequentially added to a polymerizable compound under stirring and mixed, and gently mixed until the photopolymerization initiator dissolved. The obtained mixed liquid was filtered by a membrane filter having a pore diameter of 1 μm to remove coarse particles to give an inkjet magenta ink composition.

TABLE 2

| Magenta Ink Composition | | | | | | | | | | | | | |
|---|---|---|---|---|---|---|---|---|---|---|---|---|---|
| | Magenta ink | IM-1 | IM-2 | IM-3 | IM-4 | IM-5 | IM-6 | IM-7 | IM-8 | IM-9 | IM-10 | IM-11 | IM-12 |
| Magenta pigment dispersion(s) | M1 | 25.0% | | | | | | | | | | | |
| | M2 | | 25.0% | | | | | | | | | | |
| | M3 | | | 25.0% | | | | | | | | | |
| | M4 | | | | 25.0% | | | | | | | | |
| | M5 | | | | | 25.0% | | | | | | | |
| | M6 | | | | | | 25.0% | | | | | | |
| | M7 | | | | | | | 25.0% | | | | | |
| | M8 | | | | | | | | 25.0% | | | | |
| | M9 | | | | | | | | | 25.0% | | | |
| | M10 | | | | | | | | | | 25.0% | | |
| | M11 | | | | | | | | | | | 15.0% | 15.0% |
| | M12 | | | | | | | | | | | | |
| | M13 | | | | | | | | | | 10.0% | | |
| | M14 | | | | | | | | | | | | 10.0% |
| | M15 | | | | | | | | | | | | |
| | M16 | | | | | | | | | | | | |
| | M17 | | | | | | | | | | | | |
| | M18 | | | | | | | | | | | | |
| | M19 | | | | | | | | | | | | |
| | M20 | | | | | | | | | | | | |
| Polymerizable compound | DPGDA | 65.0% | 65.0% | 65.0% | 65.0% | 65.0% | 65.0% | 65.0% | 65.0% | 65.0% | 65.0% | 65.0% | 65.0% |

TABLE 2-continued

| | | | | | | | | | | | | | |
|---|---|---|---|---|---|---|---|---|---|---|---|---|---|
| | | Magenta Ink Composition | | | | | | | | | | | |
| Photoradical polymerization initiators | DAROCUR TPO | 5.0% | 5.0% | 5.0% | 5.0% | 5.0% | 5.0% | 5.0% | 5.0% | 5.0% | 5.0% | 5.0% | 5.0% |
| | KAYACURE BMS | 2.5% | 2.5% | 2.5% | 2.5% | 2.5% | 2.5% | 2.5% | 2.5% | 2.5% | 2.5% | 2.5% | 2.5% |
| | SB-PI704 | 2.5% | 2.5% | 2.5% | 2.5% | 2.5% | 2.5% | 2.5% | 2.5% | 2.5% | 2.5% | 2.5% | 2.5% |
| Total | | 100.0% | 100.0% | 100.0% | 100.0% | 100.0% | 100.0% | 100.0% | 100.0% | 100.0% | 100.0% | 100.0% | 100.0% |

| | Magenta ink | IM-13 | IM-14 | IM-15 | IM-16 | IM-17 | IM-18 | IM-19 | IM-20 | IM-21 | IM-22 | IM-23 | IM-24 |
|---|---|---|---|---|---|---|---|---|---|---|---|---|---|
| Magenta pigment dispersion(s) | M1 | | | | | | | | | | | | |
| | M2 | | | | | | | | | | | | |
| | M3 | | | | | | | | | | | | |
| | M4 | | | | | | | | | | | | |
| | M5 | | | | | | | | | | | | |
| | M6 | | | | | | | | | | | | |
| | M7 | | | | | | | | | | | | |
| | M8 | | | | | | | | | | | | |
| | M9 | | | | | | | | | | | | |
| | M10 | | | | | | | | | | | | |
| | M11 | | | 25.0% | | | | | | | | | |
| | M12 | 15.0% | 15.0% | | 25.0% | | | | | | | | |
| | M13 | 10.0% | | | | 25.0% | | | | | | | |
| | M14 | | 10.0% | | | | 25.0% | | | | | | |
| | M15 | | | | | | | 25.0% | | | | | |
| | M16 | | | | | | | | 25.0% | | | | |
| | M17 | | | | | | | | | 25.0% | | | |
| | M18 | | | | | | | | | | 25.0% | | |
| | M19 | | | | | | | | | | | 25.0% | |
| | M20 | | | | | | | | | | | | 25.0% |
| Polymerizable compound | DPGDA | 65.0% | 65.0% | 65.0% | 65.0% | 65.0% | 65.0% | 65.0% | 65.0% | 65.0% | 65.0% | 65.0% | 65.0% |
| Photoradical polymerization initiators | DAROCUR TPO | 5.0% | 5.0% | 5.0% | 5.0% | 5.0% | 5.0% | 5.0% | 5.0% | 5.0% | 5.0% | 5.0% | 5.0% |
| | KAYACURE BMS | 2.5% | 2.5% | 2.5% | 2.5% | 2.5% | 2.5% | 2.5% | 2.5% | 2.5% | 2.5% | 2.5% | 2.5% |
| | SB-PI704 | 2.5% | 2.5% | 2.5% | 2.5% | 2.5% | 2.5% | 2.5% | 2.5% | 2.5% | 2.5% | 2.5% | 2.5% |
| Total | | 100.0% | 100.0% | 100.0% | 100.0% | 100.0% | 100.0% | 100.0% | 100.0% | 100.0% | 100.0% | 100.0% | 100.0% |

The abbreviations in the table are as follows.
*DAROCUR TPO: 2,4,6-trimethylbenzoyldiphenylphosphine oxide (manufactured by BASF)
*KAYACURE BMS: 4-benzoyl-4'-methyl-diphenylsulfide (manufactured by Nippon Kayaku Co., Ltd.)
*SB-PI704: ethyl-4-(dimethylamino)-benzoate (manufactured by Sartomer)

(Preparation of Yellow Ink Composition)
1. Preparation of Yellow Pigment Dispersion
A yellow pigment dispersion was obtained by using the materials described in Table 3 in a similar manner to the preparation of the magenta pigment dispersion.

TABLE 3

| | | | | | | | | | |
|---|---|---|---|---|---|---|---|---|---|
| | | Yellow Pigment Dispersion | | | | | | | |
| Yellow pigment dispersion | Pigment | | | | Dispersing agent | | Dispersion aid | Dispersion medium | |
| | PY180 | PY185 | PY139 | PY150 | SOLSPERSE 32000 | SOLSPERSE J100 | | DPGDA | PEA |
| Y1 | 20.00% | | | | 7.00% | | 1.00% | 72.00% | |
| Y2 | 20.00% | | | | 7.00% | | 1.00% | | 72.00% |
| Y3 | | | | | | 17.50% | | 62.50% | |
| Y4 | | 20.00% | | | 7.00% | | 1.00% | 72.00% | |
| Y5 | | | | | 7.00% | | 1.00% | | 72.00% |
| Y6 | | | | | | 17.50% | | 62.50% | |
| Y7 | | | 20.00% | | 7.00% | | 1.00% | 72.00% | |
| Y8 | | | | | 7.00% | | 1.00% | 72.00% | |
| Y9 | | | | 20.00% | 16.00% | | | 64.00% | |
| Y10 | | | | | | 40.00% | | 40.00% | |

The abbreviations in the table are as follows.
*PY180: C.I. Pigment Yellow 180
*PR185: C.I. Pigment Yellow 185
*PR139: C.I. Pigment Yellow 139

TABLE 3-continued

| Yellow pigment dispersion | Pigment | | | | Dispersing agent | | Dispersion aid | Dispersion medium | |
|---|---|---|---|---|---|---|---|---|---|
| | | | | | SOLSPERSE 32000 | SOLSPERSE J100 | | | |
| Yellow pigment dispersion | PY180 | PY185 | PY139 | PY150 | 32000 | J100 | aid | DPGDA | PEA |

*PR150: C.I. Pigment Yellow 150 ("Yellow Pigment E4GN" manufactured by Lanxess)
*PEA: 2-phenoxyethyl acrylate ("VISCOAT #192" manufactured by Osaka Organic Chemical Industry, Ltd.)

2. Preparation of Yellow Ink Composition

A yellow ink composition was obtained by using the materials described in Table 4 in a similar manner to the preparation of the magenta ink composition.

TABLE 4

Yellow Ink Composition

| Yellow ink | | IY-1 | IY-2 | IY-3 | IY-4 | IY-5 | IY-6 | IY-7 | IY-8 | IY-9 | IY-10 |
|---|---|---|---|---|---|---|---|---|---|---|---|
| Yellow pigment dispersion | Y1 | 20.0% | | | | | | | | | |
| | Y2 | | 20.0% | | | | | | | | |
| | Y3 | | | 20.0% | | | | | | | |
| | Y4 | | | | 20.0% | | | | | | |
| | Y5 | | | | | 20.0% | | | | | |
| | Y6 | | | | | | 20.0% | | | | |
| | Y7 | | | | | | | 20.0% | | | |
| | Y8 | | | | | | | | 20.0% | | |
| | Y9 | | | | | | | | | 20.0% | |
| | Y10 | | | | | | | | | | 20.0% |
| Polymerizable compound | DPGDA | 70.0% | 70.0% | 70.0% | 70.0% | 70.0% | 70.0% | 70.0% | 70.0% | 70.0% | 70.0% |
| Photoradical polymerization initiators | DAROCUR TPO | 5.0% | 5.0% | 5.0% | 5.0% | 5.0% | 5.0% | 5.0% | 5.0% | 5.0% | 5.0% |
| | KAYACURE BMS | 2.5% | 2.5% | 2.5% | 2.5% | 2.5% | 2.5% | 2.5% | 2.5% | 2.5% | 2.5% |
| | SB-PI704 | 2.5% | 2.5% | 2.5% | 2.5% | 2.5% | 2.5% | 2.5% | 2.5% | 2.5% | 2.5% |
| Total | | 100.0% | 100.0% | 100.0% | 100.0% | 100.0% | 100.0% | 100.0% | 100.0% | 100.0% | 100.0% |

(Preparation of Cyan Ink Composition)

1. Preparation of Cyan Pigment Dispersion

A cyan pigment dispersion was obtained by using the materials shown below in a similar manner to the preparation of the magenta pigment dispersion.

(Materials for Cyan Pigment Dispersion)

| Pigment LIONOL BLUE FG-7400G (a phthalocyanine pigment manufactured by Toyo Ink Co., Ltd.) | 30.0 parts |
|---|---|
| Pigment dispersing agent SOLSPERSE 32000 | 9.0 parts |
| Monomer 2-phenoxyethyl acrylate | 61.0 parts |

2. Preparation of Cyan Ink Composition

A cyan ink composition was obtained by using the materials shown below in a similar manner to the preparation of the magenta ink composition.

(Materials of Cyan Ink)

| Cyan pigment dispersion | 16.7 parts |
|---|---|
| DPGDA | 73.3 parts |
| DAROCUR TPO | 5.0 parts |
| KAYACURE BMS | 2.5 parts |
| SB-PI704 | 2.5 parts |

II. Evaluation of Ink Compositions

Using the respective ink compositions of magenta, yellow and cyan prepared above, the various properties were evaluated for ink sets formed of those ink compositions.

<Evaluation of Hue>

At first, the hue when the colors are mixed at magenta ink:yellow ink=1:1 was defined as RED region, and the hue when the colors are mixed at magenta ink:cyan ink=1:1 was defined as BLUE region.

Each combination was evaluated by the degree of the above-mentioned RED region and BLUE region to satisfy FOGRA39, which is the color standard in Europe.

The color comparison with the above-mentioned FOGRA39 was conducted by the Lab color system. Specifically, in the RED and BLUE regions reproduced by inkjet printing, Lab values were measured by a light source D50 at a visible field angle of 2° by using a spectrophotometer X-RITE528.

Inkjet printing was conducted by a single pulse format, and PET50 (K2411) PA-T1 8LK (manufactured by Lintec Corporation) was used as a printing substrate.

In the measured Lab values and the Lab values of FOGRA39, the square root $\Delta E$ of the numerical value of the sum of the squares of the differences of these values was calculated, and comparison of the coordinate values was conducted.

The comparison of the above-mentioned Lab values is specifically represented by a formula as follows.

$$\Delta E = ((L_{FOG} - L)^2 + (a_{FOG} - a)^2 + (b_{FOG} - b)^2)^{1/2}$$

In the formula, $L_{FOG}$ represents the L value of FOGRA39, and L represents the actually measured L value. Furthermore, both a and b are described in a similar manner to that of L.

The value of ΔE obtained by the above-mentioned calculation method was evaluated in accordance with the following criteria.
(Evaluation Criteria for Hue)
⊙: 2 or less can be reproduced.
○: 3 or less can be reproduced, but 2 or less cannot be reproduced.
Δ: 5 or less can be reproduced, but 3 or less cannot be reproduced.
x: More than 5.

<Evaluation of Storage Stability>
The storage stabilities of the above-mentioned magenta inks were evaluated in accordance with the following criteria.
(Evaluation Criteria for Storage Stability)
⊙: The viscosity change rate at 60° C. after 1 week is lower than 10%.
○: The viscosity change rate is 10% or more and lower than 15%.
x: The viscosity change rate is 15% or more.

The above-mentioned viscosity change rate shows the change in the viscosity with respect to the initial viscosity. Specifically, the viscosity change rate was calculated by the following formula.

Viscosity change rate(%)={(the value of the viscosity after storage at 60° C. for 1 week)−(the value of the initial viscosity)}/(the value of the initial viscosity)×100

The results of the above-mentioned various evaluations are shown in Table 5.

TABLE 5

Ink Set Evaluation Results

| | Magenta ink | Yellow ink | Cyan ink | Hue of RED region | Hue of BLUE region | Storage stability of magenta ink | Storage stability of yellow ink |
|---|---|---|---|---|---|---|---|
| Example 1 | IM-1 | IY-1 | Common | ⊙ | ○ | ⊙ | ⊙ |
| Example 2 | | IY-4 | | ⊙ | ○ | ⊙ | ○ |
| Example 3 | | IY-7 | | ⊙ | ○ | ○ | ○ |
| Example 4 | IM-2 | IY-3 | | ⊙ | ○ | ⊙ | ⊙ |
| Example 5 | | IY-6 | | ⊙ | ○ | ⊙ | ○ |
| Example 6 | | IY-7 | | ⊙ | ○ | ○ | ○ |
| Example 7 | IM-3 | IY-1 | | ⊙ | ⊙ | ⊙ | ⊙ |
| Example 8 | | IY-2 | | ⊙ | ⊙ | ⊙ | ⊙ |
| Example 9 | | IY-3 | | ⊙ | ⊙ | ⊙ | ⊙ |
| Example 10 | | IY-4 | | ⊙ | ⊙ | ⊙ | ○ |
| Example 11 | | IY-5 | | ⊙ | ⊙ | ⊙ | ○ |
| Example 12 | | IY-6 | | ⊙ | ⊙ | ⊙ | ○ |
| Example 13 | | IY-7 | | ⊙ | ⊙ | ○ | ○ |
| Example 14 | | IY-8 | | ⊙ | ⊙ | ○ | ○ |
| Example 15 | IM-4 | IY-1 | | ⊙ | ⊙ | ⊙ | ⊙ |
| Example 16 | | IY-2 | | ⊙ | ⊙ | ⊙ | ⊙ |
| Example 17 | | IY-3 | | ⊙ | ⊙ | ⊙ | ⊙ |
| Example 18 | | IY-4 | | ⊙ | ⊙ | ⊙ | ○ |
| Example 19 | | IY-5 | | ⊙ | ⊙ | ⊙ | ○ |
| Example 20 | | IY-6 | | ⊙ | ⊙ | ⊙ | ○ |
| Example 21 | | IY-7 | | ⊙ | ⊙ | ○ | ○ |
| Example 22 | | IY-8 | | ⊙ | ⊙ | ○ | ○ |
| Example 23 | IM-5 | IY-2 | | ○ | ⊙ | ⊙ | ⊙ |
| Example 24 | | IY-5 | | ○ | ⊙ | ⊙ | ○ |
| Example 25 | | IY-8 | | ○ | ⊙ | ⊙ | ○ |
| Example 26 | IM-6 | IY-1 | | ○ | ⊙ | ⊙ | ⊙ |
| Example 27 | | IY-5 | | ○ | ⊙ | ⊙ | ○ |
| Example 28 | | IY-7 | | ○ | ⊙ | ⊙ | ○ |
| Example 29 | IM-7 | IY-2 | | ⊙ | Δ | ○ | ⊙ |
| Example 30 | | IY-4 | | ⊙ | Δ | ○ | ○ |
| Example 31 | | IY-8 | | ⊙ | Δ | ○ | ○ |
| Example 32 | IM-8 | IY-3 | | ⊙ | Δ | ○ | ⊙ |
| Example 33 | | IY-6 | | ⊙ | Δ | ○ | ○ |
| Example 34 | | IY-8 | | ⊙ | Δ | ○ | ○ |
| Example 35 | IM-9 | IY-3 | | Δ | ⊙ | ○ | ⊙ |
| Example 36 | | IY-6 | | Δ | ⊙ | ○ | ○ |
| Example 37 | | IY-7 | | Δ | ⊙ | ○ | ○ |
| Example 38 | IM-10 | IY-1 | | Δ | ⊙ | ○ | ⊙ |
| Example 39 | | IY-4 | | Δ | ⊙ | ○ | ○ |
| Example 40 | | IY-8 | | Δ | ⊙ | ○ | ○ |
| Example 41 | IM-11 | IY-1 | | ⊙ | ⊙ | ○ | ⊙ |
| Example 42 | | IY-5 | | ⊙ | ⊙ | ○ | ○ |
| Example 43 | | IY-7 | | ⊙ | ⊙ | ○ | ○ |
| Example 44 | IM-12 | IY-3 | | ⊙ | ⊙ | ○ | ⊙ |
| Example 45 | | IY-6 | | ⊙ | ⊙ | ○ | ○ |
| Example 46 | | IY-7 | | ⊙ | ⊙ | ○ | ○ |
| Example 47 | IM-13 | IY-2 | common | ⊙ | ⊙ | ○ | ⊙ |

TABLE 5-continued

Ink Set Evaluation Results

|  | Magenta ink | Yellow ink | Cyan ink | Hue of RED region | Hue of BLUE region | Storage stability of magenta ink | Storage stability of yellow ink |
|---|---|---|---|---|---|---|---|
| Example 48 |  | IY-5 |  | ⊙ | ⊙ | ○ | ○ |
| Example 49 |  | IY-7 |  | ⊙ | ⊙ | ○ | ○ |
| Example 50 | IM-14 | IY-1 |  | ⊙ | ⊙ | ○ | ⊙ |
| Example 51 |  | IY-6 |  | ⊙ | ⊙ | ○ | ○ |
| Example 52 |  | IY-8 |  | ⊙ | ⊙ | ○ | ○ |
| Comparative Example 1 | IM-15 | IY-1 |  | ○ | X | ○ | ⊙ |
| Comparative Example 2 |  | IY-9 |  | ○ | X | ○ | X |
| Comparative Example 3 | IM-16 | IY-5 |  | ○ | X | ○ | ○ |
| Comparative Example 4 |  | IY-8 |  | ○ | X | ○ | ○ |
| Comparative Example 5 | IM-17 | IY-2 |  | X | ○ | ○ | ⊙ |
| Comparative Example 6 |  | IY-4 |  | X | ○ | ○ | ○ |
| Comparative Example 7 | IM-18 | IY-10 |  | X | ○ | ○ | X |
| Comparative Example 8 |  | IY-6 |  | X | ○ | ○ | ○ |
| Comparative Example 9 | IM-19 | IY-6 |  | X | ○ | X | ○ |
| Comparative Example 10 |  | IY-3 |  | X | ○ | X | ⊙ |
| Comparative Example 11 | IM-20 | IY-7 |  | X | ○ | X | ○ |
| Comparative Example 12 |  | IY-9 |  | X | ○ | X | X |
| Comparative Example 13 | IM-21 | IY-3 |  | Δ | ○ | X | ⊙ |
| Comparative Example 14 |  | IY-8 |  | Δ | ○ | X | ○ |
| Comparative Example 15 | IM-22 | IY-6 |  | Δ | ○ | X | ○ |
| Comparative Example 16 |  | IY-10 |  | Δ | ○ | X | X |
| Comparative Example 17 | IM-23 | IY-1 |  | X | ○ | X | ⊙ |
| Comparative Example 18 |  | IY-5 |  | X | ○ | X | ○ |
| Comparative Example 19 | IM-24 | IY-9 |  | X | ○ | X | X |
| Comparative Example 20 |  | IY-7 |  | X | ○ | X | ○ |

As is apparent from Table 5, Examples 7 to 9 and 15 to 17 were the optimal conditions, but all of Examples 1 to 52 tended to be fine. The reasons why Examples 7 to 9 and 15 to 17 were specifically preferable may include that the selected magenta pigments and the incorporation ratio thereof were the optimal, and that C. I. Pigment Yellow 180 was selected as the yellow pigment. It was shown by this result that it is essential to disperse the magenta pigments at a suitable incorporate ratio to form an ink.

Furthermore, it was shown that the examples using C. I. Pigment Yellow 180 as the yellow ink had fine stability. On the other hand, Comparative Examples 1 to 8 had fine dispersibility of the pigments, but were not able to reproduce a desired hue. This is because the magenta ink was prepared by only one kind of magenta pigment, and this indicates how it is important to select two kinds of magenta pigments and extract the advantages of the respective pigments therefrom. On the other hand, Comparative Examples 9 to 12 selected 2,9-dichloroquinacridone (C. I. Pigment Red 202) as the magenta pigment other than the unsubstituted quinacridone, and thus were not be able to satisfy the color reproduction property of the RED region, and were poor in dispersibility. Comparative Examples 13 to 20 selected a solid solution as the magenta pigments, and were not able to satisfy the color reproduction property of the RED region. In addition, they had poor dispersibilities, and consequently the storage stabilities of the inks were deteriorated.

The invention claimed is:

1. An active energy ray-curable inkjet magenta ink composition, comprising two kinds of quinacridone pigments, wherein the two kinds of quinacridone pigments are (A) unsubstituted quinacridone and (B) 2,9-dimethylquinacridone, said two kinds of quinacridone pigments having distinct crystal structures from one another and being present as individual components in said composition and not in the form of a solid solution.

2. The magenta ink composition according to claim 1, wherein the weight ratio of the unsubstituted quinacridone (A) and the 2,9-dimethylquinacridone (B) is (A):(B)=from 75:25 to 40:60.

3. An active energy ray-curable inkjet ink set, comprising:
the magenta ink composition of claim 1;
an active energy ray-curable inkjet yellow ink composition; and
an active energy ray-curable inkjet cyan ink composition.

4. The ink set according to claim 3, wherein the active energy ray-curable inkjet yellow ink composition comprises a yellow pigment having a benzimidazolone backbone or an isoindoline backbone.

5. An active energy ray-curable inkjet ink set, comprising:
the magenta ink composition of claim 2;
an active energy ray-curable inkjet yellow ink composition; and
an active energy ray-curable inkjet cyan ink composition.

6. The ink set according to claim 5, wherein the active energy ray-curable inkjet yellow ink composition comprises a yellow pigment having a benzimidazolone backbone or an isoindoline backbone.

7. The magenta ink composition according to claim 1, further comprising dipropylene glycol diacrylate.

8. The magenta ink composition according to claim 1, further comprising a polymerizable compound, wherein the content of the polymerizable compound in the ink composition is 60 to 95% by weight based on the total weight of the ink composition.

9. The magenta ink composition according to claim 8, comprising dipropylene glycol diacrylate as the polymerizable compound.

10. The magenta ink composition according to claim 1, further comprising a pigment dispersing agent.

11. The magenta ink composition according to claim 10, wherein the pigment dispersing agent is a basic pigment dispersing agent.

12. The magenta ink composition according to claim 2, wherein the weight ratio of the unsubstituted quinacridone (A) and the 2,9-dimethylquinacridone (B) is (A):(B)=from 75:25 to 50:50, said ink composition further comprising a polymerizable compound, wherein the content of the polymerizable compound in the ink composition is 60 to 95% by weight based on the total weight of the ink composition.

13. The magenta ink composition according to claim 12, further comprising a pigment dispersing agent.

14. The magenta ink composition according to claim 13, wherein the pigment dispersing agent is a basic pigment dispersing agent.

* * * * *